United States Patent [19]

Petersohn et al.

[11] 4,207,058
[45] Jun. 10, 1980

[54] APPARATUS FOR DRYING A CONTINUOUSLY MOVING WEB

[75] Inventors: Gerhard Petersohn, Tiefenbronn; Hans-Ulrich von der Eltz, Frankfurt am Main; Walter Birke, Frankfurt am Main; Franz Schon, Frankfurt am Main, all of Fed. Rep. of Germany

[73] Assignee: Bruckner Apparatebau GmbH, Erbach, Fed. Rep. of Germany

[21] Appl. No.: 930,132

[22] Filed: Aug. 2, 1978

[30] Foreign Application Priority Data

Aug. 4, 1977 [DE] Fed. Rep. of Germany ....... 2735075

[51] Int. Cl.² ............................................... F27B 9/28
[52] U.S. Cl. ........................................ 432/59; 432/72
[58] Field of Search ................ 432/8, 59, 72; 431/116

[56] References Cited

U.S. PATENT DOCUMENTS 3,459,410 8/1969 Uban .
3,984,197 10/1976 Birke et al. .............................. 432/59

*Primary Examiner*—John J. Camby
*Attorney, Agent, or Firm*—Learman & McCulloch

[57] ABSTRACT

Apparatus for drying a continuously moving web containing a combustible organic liquid comprises a walled chamber through which the web passes. Ignition and heating means adjacent the inlet of the web to the chamber initiates combustion of the organic liquid. Enroute to the web outlet of the chamber the web passes between heat radiating members located on opposite sides of the web so as to define between the heat radiating members a main combustion zone. Hot waste gases of combustion are led from the main combustion zone to an after combustion zone defined in part by the heat radiating members and in part by guide members located within the the chamber. The waste gases are drawn through the after combustion zone to waste gas outlets by means of a suction fan, the heat radiating members being heated by the waste gases.

23 Claims, 5 Drawing Figures

APPARATUS FOR DRYING A CONTINUOUSLY MOVING WEB

This invention relates to an apparatus for drying a continuously moving web by burning a combustible organic liquid entrained by the web in a chamber which is provided with an entry and exit opening for the web, a heating and ignition means disposed near the entry opening and with at least one entry opening for combustion air and an exit opening for waste gases.

In a known apparatus of the type mentioned (DT-PS No. 2,214,714) a relatively large combustion chamber is provided through which the web to be dried passes substantially vertically, the web exit opening is sealed by safety metal rolls and air entry openings are disposed at the one end with waste gas exit openings at the other end; furthermore, safety nozzles project into the combustion chamber and are directed onto the web, via which if necessary gases stopping the combustion can be introduced. Substantial disadvantages of this known apparatus reside in an uneconomic use of the gases formed by the combustion of the combustible liquid, in the too sluggishly responsive safety means and in the danger that a relatively large proportion of residual noxious substances forming on partial oxidation of the organic liquid emerge from the apparatus with the web.

The objective of the invention is to provide an apparatus of the type mentioned, but which is distinguished in particular by the economic utilisation of the combustion gases forming in the chamber and by its safe and reliable function.

According to the invention, this objective is achieved in that in the chamber on each side of the web and spaced from the latter is a radiation wall of material suitable for heat radiation and the waste gas exit opening is so disposed that at least a part of the waste gases flows along the rear side of the radiation walls remote from the web to the exit opening.

To dry a web entering the chamber in the embodiment according to the invention by burning the organic liquid entrained thereby, said organic liquid is heated by the heating means provided near the web entry opening and ignited by the igniting means and caused to burn. It has been found in tests on which the invention is based that the combustion gases forming during this burning still contain a considerable proportion of combustible substances. This fact is utilised in the invention by retaining the waste gases for a greater time in the chamber and deflecting them so that they pass over the rear side of the radiation walls whereby the latter are additionally heated from their backs and thus brought to red heat. This produces heat radiation in the space between the radiation walls and through which the web passes which is so strong that after a relatively short starting time the ignition means may be switched off again. In this manner an extremely economic utilisation of the organic liquid (in particular methanol) entrained by the web is obtained and reliable drying of the web is achieved with great safety.

The radiation walls are preferably made of metallic or ceramic material with high heat radiation capacity. It is particularly convenient for the waste gas fan extracting the waste gases from the after-combustion chamber to be controlled in its speed of rotation in dependence upon the combustion chamber temperatures so that on the one hand an optimum utilisation of the combustion gases is achieved and on the other a reliable combustion drying of the web in the chamber.

According to a particularly advantageous further development of the invention there is associated with the web exit opening an after-aeration space in which an air flow is blown onto the web or sucked from the latter.

By this feature a counterflow aeration of the dried web emerging from the chamber can be obtained. The residual noxious substances still adhering to the web can thus be withdrawn from the web leaving the chamber so that said noxious substances can no longer emerge into the atmosphere. Furthermore, at the same time a certain preheating of the fresh air to be introduced into the after-combustion space can be obtained; at the same time, the dried web is also subjected to a certain cooling.

It is further convenient according to the invention if at least in the region between the web entry opening of the chamber and the heating means spray tubes to which water or steam can be selectively supplied are provided on both sides of the web. These spray tubes represent in particular safety means which operate when there is a danger of fire and via which in particular water can be sprayed onto the web, representing an exceedingly rapidly acting means. According to a further feature of the invention these spray nozzles may be operated during the heating-up period by supplying them with steam to avoid burning of the web by excessive heat radiation. Shutters as used in some cases in known apparatuses in this area can be omitted when using water and steam spray tubes. According to a further feature of the invention in the after-combustion space substantially downwardly drawn waste gas guide walls are provided which shield the waste gas exit opening connected to the suction opening of a waste gas fan. This produces a constrained conveying of the waste gases along the back of the metallic radiation walls so that the waste gases can reach the waste gas exit opening only after substantial utilisation of the combustible substances contained therein.

A further contribution to optimum drying action according to a further feature of the invention is that the web feed speed is controllable in dependence upon the residual moisture. It has been found in the tests on which the invention is based that a particularly reliable regulation is achieved if the web speed is controlled in dependence upon this residual moisture.

The invention will be explained hereinafter in detail with reference to several embodiments illustrated in the drawings, wherein.

Figure 1:
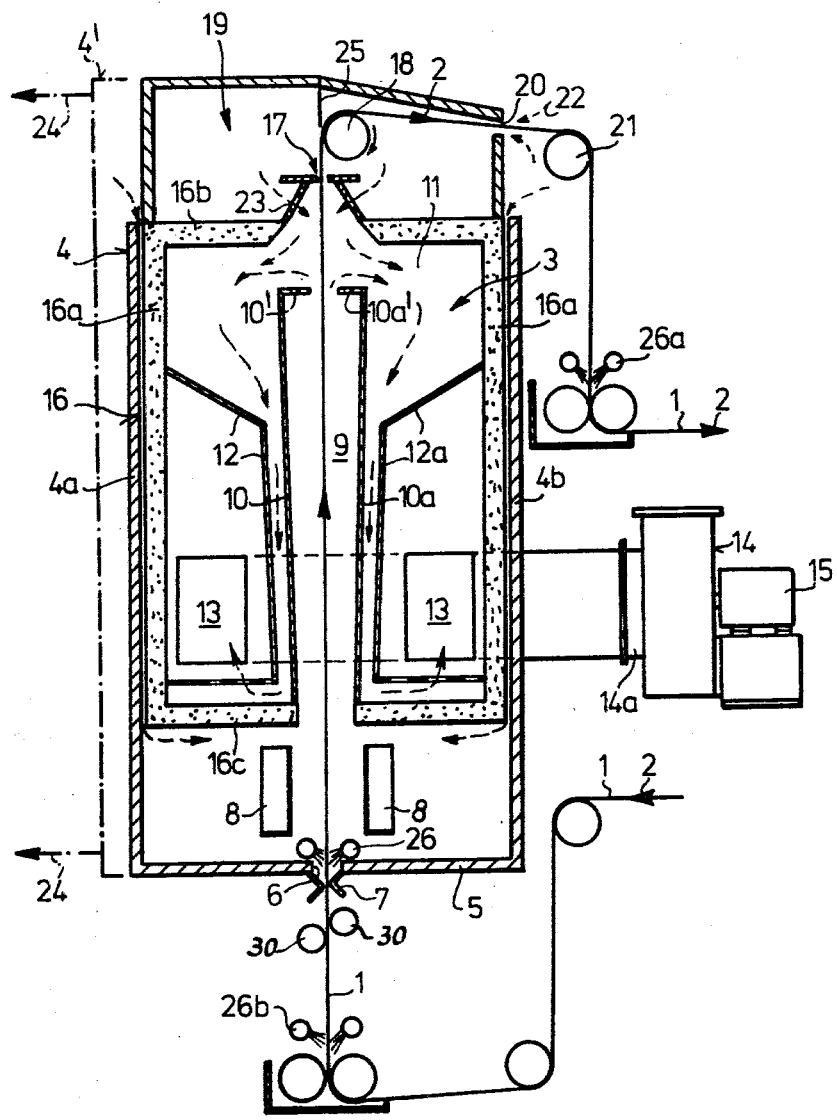
FIG. 1 is a substantially schematic vertical cross-section through a drying apparatus according to the invention.

The drying apparatus illustrated in FIG. 1 serves to dry a web 1 of material which is fed in the direction of the arrows 2 continuously through a chamber denoted as a whole as combustion chamber 3. In this case the web 1 is conveyed substantially vertically (substantially in the vertical longitudinal centre plane of the apparatus) through the combustion chamber 3 with the aid of feed means to be explained in detail hereinafter. The apparatus comprises an outer housing 4 in which the combustion chamber 3 is disposed. In the bottom 5 of the apparatus housing 4 there is a web entry opening 6 with which a sort of lock 7 is associated through which the web 1 and possibly a small amount of fresh air enters the combustion chamber 3.

A short distance above the web entry opening 6 in the combustion chamber 3 is a heating means which is preferably formed by two infrared radiators 8 which are disposed with adequate spacing on opposite sides of the web 1. Also provided is an ignition means which is not illustrated (eg. a gas flame for single ignition at the start of the operation).

Extending above the heating means 8 is a narrow combustion space 9 through which the web 1 to be dried passes, said space 9 occupying a substantial part of the height of the combustion chamber 3. This main combustion space 9 is formed by two preferably metallic radiation walls 10, 10a which are provided in the combustion chamber 3 on opposite sides of the web 1 spaced from the latter and are disposed substantially perpendicularly or diverging slightly upwardly in the combustion chamber 3, the upper ends 10' and 10a' of said radiation walls being bent towards the web 1 and terminating a slight distance from said web 1 or from the web feed plane. Outside the radiation walls 10, 10a an after-combustion spaced is formed in the combustion chamber 3.

In the upper portion of the combustion chamber 3 the after-combustion space comprises a widened gas collecting and mixing portion 11 spaced from the radiation walls 10, 10a, remote from the web, waste gas guide walls 12, 12a are disposed. The construction and arrangement of these waste gas guide walls 12, 12a are such that the waste gas emerging from the main combustion space 9 upwardly into the after-combustion space are led from the gas collecting and mixing portion 11 against the backs of the radiation walls 10, 10a remote from the web 1 and along said backs downwardly, flowing from there into the waste gas exit openings 13. For this purpose, the major portions of the waste gas guide walls 12, 12a are disposed in spaced relationship parallel to the backs of the radiation walls 10, 10a. In this manner, counterflow passages are formed between the radiation walls 10, 10a and the waste gas guide walls 12, 12a and in these passages waste gases flow counter to the combustion gases in the main combustion space 9. The waste gas guide walls 12, 12a shield the waste gas exit openings 13, which are connected to the suction opening 14a of a waste gas fan 14. The motor of said fan 14 can be driven and controlled so that the fan speed is regulated in dependence upon the combustion space temperature.

As clearly is apparent from FIG. 1, the main combustion space 9 and the after-combustion space 11 are surrounded by an insulating housing 16 which is made up of the side walls 16a and an upper cover 16b and a lower bottom 16c, adequately dimensioned passage openings for the web 1 and for the fresh air supplied being provided in the cover 16b and the bottom 16c. As clearly is shown in FIG. 1, the insulating side walls 16a are spaced from the side walls 4a, 4b of the apparatus housing 4 so that part of the combustion air sucked into the chamber 3 can be introduced between the double walls thus formed.

Above the insulating cover 16b of the combustion chamber 3 is a web exit opening (substantially vertically above the entry opening 6) which is also formed in the manner of a lock 17. Disposed above this web exit opening 17 is a feed roll 18 which ensures continuous feed of the web through the apparatus (in the direction of the arrow 2).

Disposed above the upper insulating cover 16b of the combustion chamber 3 is an after-aeration space 19 which is thus associated with the web exit opening 17 and in which the feed roll 18 also lies relatively closely above the web exit opening 17. Said after-aeration space 19 comprises a web exit opening, on the right in FIG. 1, in the form of an exit slot 20 with which a deflection roll 21 for the web 1 is associated. As indicated by the arrow 22, through this web exit slot 20 fresh air can be introduced into the after-aeration space 19 so that said fresh air provides a counterflow aeration or ventilation of the web coming from the combustion chamber 3. The fresh air thus slightly heated and charged with residual noxious substances from the web passes through the fresh air supply openings 23 in the region of the web exit lock or opening 17 into the gas collecting and mixing portion, widened at the top, of the after-combustion space 11.

As indicated by the dot-dash line 4' and the arrows 24 in FIG. 1, in many uses of the drying apparatus according to the invention it may be advantageous for the entire apparatus housing to be divided in the region of the vertical feed plane of the web 1, i.e. about at the line 25, and so constructed that at least the one housing half (in FIG. 1 the left half) can be removed from the other and returned thereto. It is obviously also possible to make both housing halves movable away from and towards each other; removability of only one housing half can however be achieved with relatively low constructional expenditure. This represents on the one hand a safety measure and on the other optimises the drying operation by permitting variation of the spacing and thus improved adaptation to different types of webs and moisture absorption, and on the other hand avoids burning of the web should it become necessary to stop operation.

A further feature in conjunction with drying apparatus of the invention comprises spray tubes 26 provided in the region between the web entry opening 6 of the combustion chamber 3 and the heating means 8 on opposite sides of the web 1, to which tubes water or sand can be supplied when necessary. These spray tubes 26 are provided as safety means and in the case of fire are supplied with water. When starting up the drying apparatus, i.e. at least for as long as the infrared radiators of the heating means 8 are in operation, a fine water mist or water vapor may be sprayed through said tubes 26 onto the web 1 so that on the one hand the infrared radiation is absorbed and on the other the web 1 is cooled to avoid burning of the web during the heating-up period.

Similar water spraying tubes 26a and 26b may be provided behind the web exit slot 20 of the after-aeration space 19 and in front of the web entry opening 6 of the combustion chamber 3 on both sides of the web 1.

Figure 4:
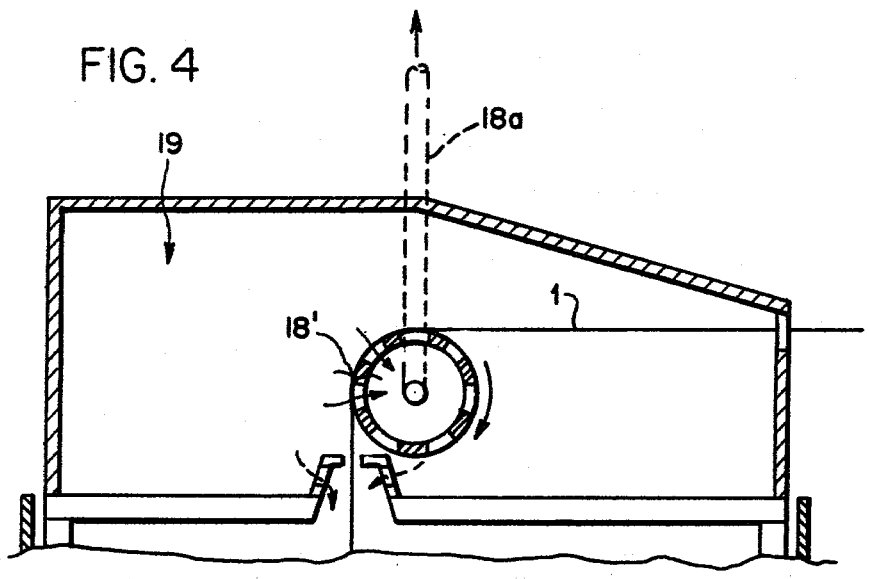
FIG. 4 is a view similar to FIG. 2, and illustrating a modification.

It is further pointed out that the feed roll disposed in the after-aeration space 19 above the web exit opening 17 can be adapted to the various purposes of the drying apparatus. Apart from the usual construction serving only for the transport of the web 1 this roll may for example be in the form of a hollow suction roll 18' (see FIG. 4) with air-permeable surface to which suction may be supplied via a pipe 18a so that the counterflow aeration of the web 1 emerging from the chamber 3 desired in the after-aeration space 19 can take place either only with the aid of this suction roll or additionally via this suction roll to the fresh-air supply via the exit slot 20. It is also possible to use a sealed feed roll 18' (FIG. 5) as one heated with steam or cooled with water via a pipe 18b; a water cooling is expedient with temperature-sensitive materials and low material moisture whereas steam or vapor heating prevents condensation and contributes to uniformity with temperature-sensitive webs and to material moisture.

Apart from the possibilities outlined above of the counter-flow aeration of a dried web of material in the after-aeration space, it is also possible to blow fresh air onto the dried web with the aid of nozzles. Such an embodiment is explained with reference to FIG. 2.

Figure 2:
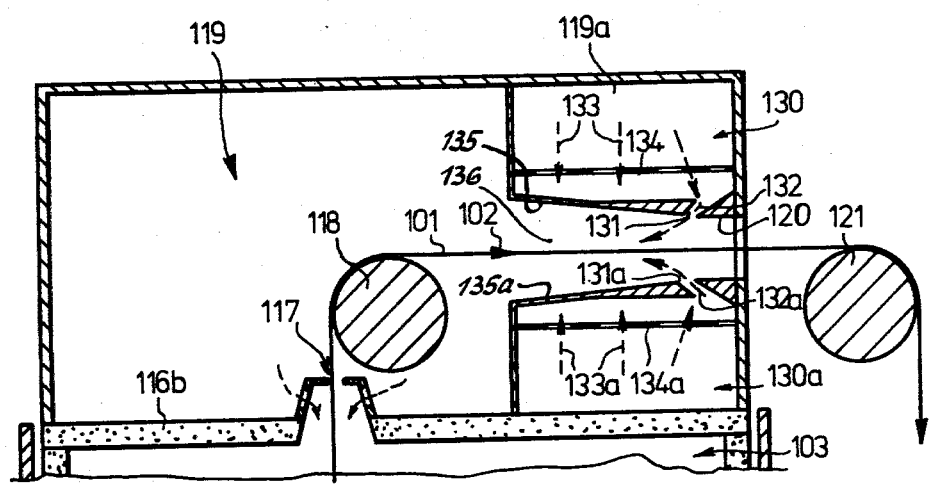
FIG. 2 is a partial section through the upper portion of the apparatus similar to that of FIG. 1 but of a second embodiment of the invention.

For simplicity, in FIG. 2 substantially only the after-aeration space provided above the combustion chamber is illustrated; all the other parts can be constructed in the same manner as FIG. 1. In the same manner as in the preceding embodiment, in the after-aeration space 119 of this embodiment a feed roll 118 is disposed above the web exit opening 117 of the chamber 103, formed by a sort of lock. The combustion spaces are also separated in this case by an insulating cover 116b from the after-aeration space 119.

In the after-aeration space 119 the dried web 101 coming from the combustion chamber 103 is deflected by the feed roll 118 and conveyed substantially horizontally to the exit slot 120 (direction of the arrow 102), in the region of which it is deflected downwardly by a deflection roll 121.

As is apparent from FIG. 2, at least in the portion 119a of the after-aeration or ventilation space 119 adjacent the web exit slot 120, above and below the web 101 a fresh-air supply chamber 130 and 130a respectively is provided, which each have at least one fresh-air supply nozzle 131 and 131a' which extends over the entire width of the web and which is preferably directly inwardly onto the web 101, with respect to the interior of the aeration space 119, as indicated by the aeration arrows 132 and 132a. Within each fresh-air supply chamber 130, 130a for directing the fresh air entering (arrows 133, 133a) in each case a perforated or screen bottom 134, 134a may be provided. It may also be expedient for the counterflow aeration of the web 101 for the walls 135, 135a of the supply chambers 130, 130a facing the web 101 to form a passage 136 diverging substantially from the region of the web exit slot 120 into the interior of the after-aeration space 119.

A further modification of the upper portion of the combustion chamber will be explained with reference to the partial section of FIG. 3. Since this modification involves only the inside of the combustion chamber 203 and other constructional parts in the upper portion of the apparatus will not be discussed in detail; they may be made both in accordance with FIG. 1 and in accordance with FIG. 2.

Figure 3:
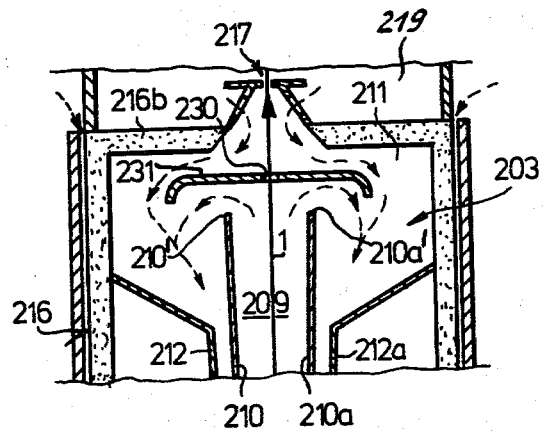
FIG. 3 is a partial section of the upper portion of the apparatus similar to FIG. 1 but of a different embodiment of the combustion chamber.

The essential difference of this embodiment according to FIG. 3 resides in that in the region between the upper ends 210', 210a' of the radiation walls 210, 210a and the web exit opening 217 a deflection plate 231 is provided which comprises a web passage slot 230 and serves to deflect combustion gases coming from the main combustion space 209 into the after-combustion space 211. The deflection plate 231 is adequately spaced from the cover 216b of the insulating housing 216 so that the preheated fresh air supplied from the after-aeration space 219 can enter unrestricted into the after-combustion space 211 and mix there with the deflected combustion gases in the upper portion. In addition, when the web 1 passes through the slot 230 upwardly the combustion gas/vapor layer covering the web on both sides is substantially removed from the web and conducted by the deflection plate 231 into the interior of the after-combustion space 211. This feature enables a further increase in the performance of the drying apparatus of the invention to be achieved.

In all the embodiments explained above it is of course possible to introduce either unpreheated fresh air or fresh air preheated in suitable manner into the respective after-aeration space (above the combustion chamber). This preheating of fresh air may be effected in different manners, for example by a heat exchanger not shown in detail, partly by the double wall comprising the apparatus housing and insulating housing or in any other desired manner; it is also possible to utilise the waste gases removed from the apparatus for transferring any heat content they may still have to the fresh air.

It is further also obvious that the drying apparatus may either have a width (perpendicular to the plane of the drawing of FIGS. 1 to 3) which is adapted to the web width generally involved or which may be variable in adaptation to the particular webs to be dried.

Regarding the introduction of the fresh air into the combustion chamber (with the aid of the waste gas fan), generally speaking preferably only a relatively small proportion of fresh air passes through the web entry slot into the combustion chamber whilst a proportion of for example about 30% enters the after-combustion chamber via the after-aeration chamber from above and the remainder (major portion) enters essentially through the double walls which are formed by the side walls of the apparatus housing and the insulating housing. This latter feature provides on the one hand a preheating of the fresh air and on the other an additional insulation, as a result of which the insulating walls, in contrast to known constructions, may be kept relatively thin (considerable saving of material).

If they are to be taken periodically out of operation, the infrared radiators forming the heating-up means 8 may be pivotal for example through 90° or 180°.

To permit exactly central passage of the web between the infrared radiators at the radiation walls and thus ensure a particularly uniform combustion, stabilising rolls 30 are provided in the vicinity of the web entry opening 6.

It is also expedient to provide UV signals as flame monitors, firstly for monitoring the flame during the operation (these flame monitors are expediently arranged at the beginning of the flame zone) and secondly as fire alarms (conveniently disposed at the exit-side end of the shaft).

To avoid thermal stresses the radiation walls are preferably made up of individual U-shaped radiation plates, for example 20 cm wide, said preferably U-shaped plates being suspended at their upper end and being freely expandable both downwardly and laterally. These radiation plates are connected in suitable manner to form the radiation wall.

Figure 5:
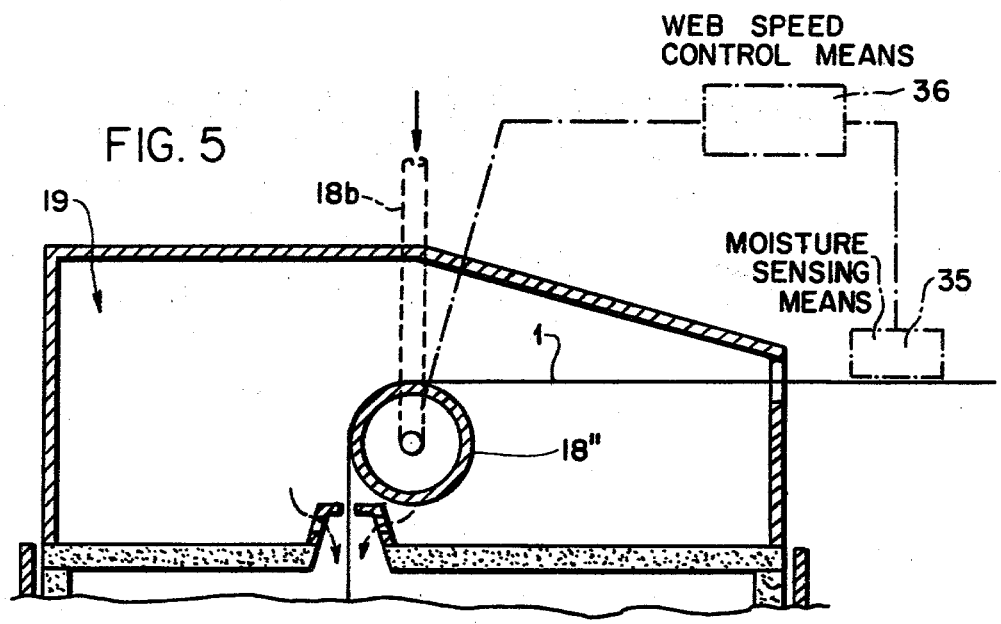
FIG. 5 is a view similar to FIG. 4, but of another modification and also illustrating web speed regulating apparatus.

FIG. 5 discloses an arrangement for regulating the speed of travel of the web 1 in dependence of its moisture. The arrangement includes a moisture sensor 35 overlying the web 1 as it emerges from the after-aeration space 19. The sensor 35 is a known device which generates a signal in response to a change in moisture content sensed by the sensor. The signal from the sensor is led to a speed control device 36, also of known construction, which is coupled to the feed roll 18″ in a known manner to vary the rate of rotation of the feed roll inversely according to the moisture sensed by the sensor. It will be understood that the sensor 35 and the speed control device 36 also may be used in any of the embodiments disclosed in FIGS. 1–4.

We claim:

1. In apparatus for drying a web in which a combustible organic substance is entrained and which moves continuously through a walled chamber having web inlet and web outlet openings, heating means adjacent the web inlet opening for combusting said substance, said chamber having combustion air entry means and hot waste gas exit means, the improvement comprising heat radiating means spaced from each other and supported within said chamber on opposite sides of said web to form a passage for said web with one side of each of said radiating means confronting said web; and means for directing said hot waste gas first through said passage and then along the opposite side of each of said radiating means as said waste gas moves toward said exit means, whereby said heat radiating means are heated in part on opposite sides by said waste gas.

2. Apparatus according to claim 1 wherein said heat radiating means are supported in said chamber such that the passage between said radiating means defines a main combustion zone and wherein said heat radiating means terminate short of said outlet opening to define between said main combustion zone and said outlet opening an after combustion zone in communication with said main zone and with said exit means.

3. Apparatus according to claim 1 wherein said heat radiating means comprise members formed of good thermal radiation capacity.

4. Apparatus according to claim 3 wherein said members comprise U-shaped plates suspended from their upper ends for free downward expansion.

5. Apparatus according to claim 1 wherein said chamber is positioned within a walled housing, the walls of said housing and said chamber being spaced to provide air passages in communication with said air entry means.

6. Apparatus according to claim 1 wherein said after-combustion zone includes an upper portion at the top of said chamber which converges downwardly.

7. Apparatus according to claim 1 including fan means in communication with said exit means for exhausting waste gas from said chamber.

8. Apparatus according to claim 7 wherein said fan means is variable in speed.

9. Apparatus according to claim 1 wherein said web passes substantially vertically through said chamber and including at least one feed roll mounted above the web outlet opening.

10. Apparatus according to claim 9 wherein said feed roll has air permeable surface.

11. Apparatus according to claim 9 including means for heating said feed roll.

12. Apparatus according to claim 9 including means for cooling said feed roll.

13. Apparatus according to claim 1 wherein said chamber is positioned within a walled housing, said housing being formed of two movable halves separable from one another.

14. Apparatus according to claim 1 including means forming an after-aeration space in communication with said chamber via said web outlet opening, and means for aerating said web in said after-aeration space.

15. Apparatus according to claim 14 wherein the means forming said after-aeration space has a web exit slot through which air may pass into or out of said after-aeration space.

16. Apparatus according to claim 14 wherein the means for aerating said web comprise air nozzles on opposite sides of said web.

17. Apparatus according to claim 14 wherein said aerating means includes air preheating means.

18. Apparatus according to claim 14 including web feed roll means mounted in said aeration space in a position to engage said web.

19. Apparatus according to claim 18 wherein said feed roll means is mounted in said after-aeration space adjacent said web outlet opening and comprises a suction roll having an air permeable surface.

20. Apparatus according to claim 1 wherein the means for directing said waste gas comprises a deflector mounted within said chamber adjacent its upper end, said deflector having an opening through which said web may pass.

21. Apparatus according to claim 1 including spray means mounted in said chamber between said web inlet opening and said heating means for spraying a selected substance onto said web.

22. Apparatus according to claim 1 including spray tubes mounted adjacent the web outlet opening for spraying a selected substance onto said web.

23. Apparatus according to claim 1 including means for controlling the speed of movement of said web in dependence upon its residual moisture.

* * * * *